US009909277B2

(12) United States Patent
Silar et al.

(10) Patent No.: US 9,909,277 B2
(45) Date of Patent: Mar. 6, 2018

(54) *IN SITU* WASTE REMEDIATION METHODS AND SYSTEMS

(71) Applicants: Silar Services, Inc., Blue Bell, PA (US); Natural Resource Technology, Inc., Milwaukee, WI (US)

(72) Inventors: James Tim Silar, Blue Bell, PA (US); Glenn R. Luke, Wauwatosa, WI (US); Christopher A. Robb, Hartford, WI (US); Roy E. Wittenberg, Fox Point, WI (US)

(73) Assignees: SILAR SERVICES INC., Blue Bell, PA (US); NATURAL RESOURCE TECHNOLOGY, INC., Milwaukee, WI (US)

( * ) Notice: Subject to any disclaimer, the term of this patent is extended or adjusted under 35 U.S.C. 154(b) by 0 days.

(21) Appl. No.: 15/041,159

(22) Filed: Feb. 11, 2016

(65) Prior Publication Data

US 2016/0237639 A1    Aug. 18, 2016

Related U.S. Application Data

(60) Provisional application No. 62/115,218, filed on Feb. 12, 2015.

(51) Int. Cl.
*E02D 31/00* (2006.01)
*B09B 1/00* (2006.01)

(52) U.S. Cl.
CPC .............. *E02D 31/006* (2013.01); *B09B 1/00* (2013.01); *B09B 1/008* (2013.01)

(58) Field of Classification Search
CPC ........... B09B 1/004; B09B 1/00; B09B 1/006; B09B 1/008; Y02W 30/32; E02B 3/04; E02D 31/002; E02D 17/18; C04B 18/0472; C04B 18/049
USPC ... 405/129.45, 129.5, 129.55, 129.57, 129.6, 405/129.7, 129.75, 129.8, 129.9, 129.95
See application file for complete search history.

(56) References Cited

U.S. PATENT DOCUMENTS

| | | | |
|---|---|---|---|
| 3,410,095 A | 11/1968 | Turzillo et al. | |
| 4,043,909 A * | 8/1977 | Endo | B01F 7/00733 210/170.01 |
| 4,063,424 A * | 12/1977 | Takagi | E02D 3/126 405/222 |
| 4,065,928 A * | 1/1978 | Takagi | E02D 5/18 405/267 |
| 4,065,933 A * | 1/1978 | Katayama | E02D 5/18 405/223 |

(Continued)

*Primary Examiner* — Benjamin F Fiorello
*Assistant Examiner* — Edwin J Toledo-Duran
(74) *Attorney, Agent, or Firm* — Jenkins, Wilson, Taylor & Hunt, P.A.

(57) ABSTRACT

Disclosed herein are in situ waste remediation methods and systems configured to hydraulically isolate waste material from groundwater. Methods for enclosing and/or remediating waste impoundments, landfills and the like using discrete in situ solidification/stabilization techniques are provided. The disclosed methods and systems provide containment techniques to create a vertical barrier to further isolate waste from groundwater and enhance geotechnical stability by increasing embankment strength, reducing saturated conditions and increasing the overall factor of safety for slope failure.

18 Claims, 6 Drawing Sheets

(56) References Cited

U.S. PATENT DOCUMENTS

| | | | | |
|---|---|---|---|---|
| 4,069,678 A * | 1/1978 | Miura | ................... | E02D 3/126 |
| | | | | 405/263 |
| 4,084,383 A * | 4/1978 | Kukino | ................... | E02D 3/126 |
| | | | | 366/301 |
| 4,089,183 A * | 5/1978 | Endo | ................... | E02D 3/12 |
| | | | | 405/267 |
| 4,189,239 A * | 2/1980 | Miyaguchi | ................... | B01F 7/1655 |
| | | | | 366/170.3 |
| 4,212,548 A * | 7/1980 | Miyaguchi | ................... | B01F 7/1655 |
| | | | | 210/219 |
| 4,402,630 A * | 9/1983 | Miura | ................... | E02D 3/126 |
| | | | | 405/258.1 |
| 4,436,453 A * | 3/1984 | Miura | ................... | E02D 3/126 |
| | | | | 175/61 |
| 4,449,856 A * | 5/1984 | Tokoro | ................... | E02D 3/12 |
| | | | | 405/269 |
| 4,475,847 A * | 10/1984 | Cornely | ................... | C08G 18/4825 |
| | | | | 405/264 |
| 4,715,746 A | 12/1987 | Mann et al. | | |
| 5,013,185 A * | 5/1991 | Taki | ................... | E02D 3/126 |
| | | | | 405/128.45 |
| 5,118,223 A * | 6/1992 | Taki | ................... | E02D 5/18 |
| | | | | 405/129.8 |
| 5,163,784 A * | 11/1992 | Kunito | ................... | E02D 3/126 |
| | | | | 405/263 |
| 5,202,033 A * | 4/1993 | Stanforth | ................... | B09C 1/08 |
| | | | | 210/911 |
| 5,259,705 A * | 11/1993 | Breaux | ................... | B09B 1/008 |
| | | | | 405/129.8 |
| 5,260,502 A * | 11/1993 | Fryer | ................... | B09C 1/08 |
| | | | | 106/794 |
| 5,275,513 A * | 1/1994 | Geary, Jr. | ................... | E02D 3/126 |
| | | | | 405/263 |
| 5,294,215 A * | 3/1994 | Millgard | ................... | E02D 5/34 |
| | | | | 405/233 |
| 5,295,767 A * | 3/1994 | Taki | ................... | E02D 3/12 |
| | | | | 405/232 |
| 5,295,769 A * | 3/1994 | Sano | ................... | E02D 3/126 |
| | | | | 405/263 |
| 5,354,149 A * | 10/1994 | Breaux | ................... | B09B 1/008 |
| | | | | 405/129.6 |
| 5,360,293 A * | 11/1994 | Breaux | ................... | B09B 1/008 |
| | | | | 405/129.8 |
| 5,368,415 A * | 11/1994 | Kono | ................... | E02D 3/126 |
| | | | | 405/233 |
| 5,378,085 A * | 1/1995 | Kono | ................... | E02D 3/126 |
| | | | | 405/233 |
| 5,417,522 A * | 5/1995 | Kono | ................... | E02D 3/12 |
| | | | | 405/236 |
| 5,490,741 A * | 2/1996 | Fryer | ................... | B01F 15/0298 |
| | | | | 366/177.1 |
| 5,542,782 A * | 8/1996 | Carter, Jr. | ................... | E02D 5/18 |
| | | | | 37/344 |
| 5,608,137 A * | 3/1997 | Wilkins | ................... | B09C 1/00 |
| | | | | 405/128.5 |
| 5,674,176 A * | 10/1997 | Pierce | ................... | A62D 3/33 |
| | | | | 405/129.3 |
| 5,765,965 A * | 6/1998 | Carter, Jr. | ................... | E02D 19/16 |
| | | | | 37/344 |
| 5,816,748 A * | 10/1998 | Kleiser | ................... | E02D 31/006 |
| | | | | 175/61 |
| 5,836,690 A * | 11/1998 | Davis | ................... | B01F 7/00258 |
| | | | | 366/325.2 |
| 5,905,184 A * | 5/1999 | Carter, Jr. | ................... | B09B 1/00 |
| | | | | 405/129.5 |
| 5,934,840 A * | 8/1999 | Nicholson | ................... | E02D 3/126 |
| | | | | 405/229 |
| 5,957,624 A * | 9/1999 | Carter, Jr. | ................... | E02D 5/18 |
| | | | | 405/129.6 |
| 5,961,437 A * | 10/1999 | Smith | ................... | E02D 31/004 |
| | | | | 210/901 |
| 5,967,700 A * | 10/1999 | Gunther | ................... | E02D 3/12 |
| | | | | 405/226 |
| 6,033,154 A * | 3/2000 | Curtis | ................... | E02F 3/40 |
| | | | | 37/403 |
| 6,059,449 A * | 5/2000 | Davis | ................... | B01F 7/005 |
| | | | | 366/325.2 |
| 6,152,656 A * | 11/2000 | Curtis | ................... | B09B 1/00 |
| | | | | 37/307 |
| 6,171,024 B1 * | 1/2001 | Curtis | ................... | B09B 1/00 |
| | | | | 405/128.15 |
| 6,575,663 B2 * | 6/2003 | Kostelnik | ................... | B09B 1/00 |
| | | | | 405/129.5 |
| 6,758,634 B2 * | 7/2004 | Nickelson | ................... | B09B 1/00 |
| | | | | 405/129.55 |
| 6,910,829 B2 * | 6/2005 | Nickelson | ................... | B09B 1/00 |
| | | | | 405/129.2 |
| 7,056,063 B2 * | 6/2006 | Richardson | ................... | B09B 1/00 |
| | | | | 405/129.5 |
| 7,070,359 B2 * | 7/2006 | Richardson | ................... | E21B 7/20 |
| | | | | 175/113 |
| 7,153,061 B2 * | 12/2006 | Nickelson | ................... | B09B 1/00 |
| | | | | 405/128.65 |
| 7,160,061 B2 * | 1/2007 | Nickelson | ................... | B09B 1/00 |
| | | | | 405/129.8 |
| 7,690,513 B1 * | 4/2010 | Gustin | ................... | B03B 5/02 |
| | | | | 209/132 |
| D648,193 S * | 11/2011 | Wheat | ................... | D8/8 |
| 8,182,178 B2 | 5/2012 | Wang et al. | | |

* cited by examiner

IN SITU WASTE REMEDIATION METHODS AND SYSTEMS

CROSS-REFERENCE TO RELATED APPLICATIONS

This application claims benefit of U.S. Provisional Patent Application Ser. No. 62/115,218, filed Feb. 12, 2015, which is herein incorporated by reference in its entirety.

TECHNICAL FIELD

The present disclosure relates to in situ waste remediation methods and systems. The present disclosure also relates to methods for hydraulically isolating waste material from groundwater. More particularly, the present disclosure relates to methods for enclosing and/or remediating waste impoundments, landfills and the like using discrete in situ solidification/stabilization techniques. The present disclosure further relates to utilizing containment techniques, such as in situ solidification/stabilization wall, slurry wall, sheet pile wall, etc., to create a vertical barrier to further isolate waste from groundwater and enhance geotechnical stability by increasing embankment strength, reducing saturated conditions and increasing the overall factor of safety for slope failure.

BACKGROUND

Waste impoundments, landfills, ash impoundments and the like face a complex web of regulations that present significant compliance risks to manage. Mitigating the environmental risks that such waste containment facilities pose and meeting compliance requirements are significant challenges.

Many waste impoundments are of similar construction, including for example large scale basins, surrounded by soil berms or dikes to create storage for waste, and often times constructed without a liner. Consequently, common concerns and technical challenges include waste located below the water table that can serve as a continual source for leaching of waste contaminants to groundwater; placement of saturated waste within the impoundment can lead to an increase in hydraulic head above the naturally occurring groundwater table exacerbating contaminant leaching; historic infrastructure near and within waste impoundments can serve as potential migration pathways for leaching from the impoundment to surface water and groundwater and also contribute to geotechnical instability; and saturated and differential hydraulic conditions can potentially compromise impoundment geotechnical stability along surface water bodies.

To fully resolve these technical challenges and considerations, the waste must be hydraulically isolated from the groundwater and the geotechnical strength characteristics maintained or enhanced to decrease the potential for instability. Such a need has not previously been met, particularly for existing waste containment facilities, such as waste impoundments, landfills, ash impoundments and the like, where waste is already in place within the waste containment facility. These concerns are applicable and persist at numerous types of waste facilities, including, but not limited to, waste impoundments for coal combustion residuals (ash), mine tailings, drill cuttings and fluids, confined disposal facilities for dredged sediments, acid tar lagoons, and abandoned municipal landfills.

Thus, there is an established need for methods, systems and devices which can provide a technically sound and low cost closure/remediation approach for waste impoundments to comply with regulatory requirements and mitigate existing environmental concerns.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

Provided herein are methods for hydraulically isolating waste material from groundwater, comprising constructing a hydraulic barrier between the waste material and ground water, including penetrating a waste material to a desired depth, wherein the desired depth comprises an area selected to construct a hydraulic barrier which isolates the waste material from the ground water, and applying a cementitious grout at the desired depth, whereby a low permeability hydraulic barrier is formed between the waste material and ground water source. In some embodiments penetrating a waste material to a desired depth comprises advancing a large diameter auger through the waste material to the desired depth. In some embodiments the cementitious grout comprises hydraulic cements and admixtures designed to mix with geologic materials and/or waste to reduce hydraulic conductivity and increase the unconfined strength of the resulting mixture. In some embodiments the low permeability hydraulic barrier has a permeability with a range of $1 \times 10^{-5}$ cm/sec to $1 \times 10^{-10}$ cm/sec, and wherein the unconfined compressive strength achieves a range of strengths designed to meet project requirements ranging as low as about 10 psi to greater than about several thousand psi. In some embodiments penetrating a waste material to a desired depth and applying a cementitious grout at the desired depth is repeated a plurality of times in an overlapping pattern so that a continuous low permeability hydraulic barrier is formed between the waste material and ground water source.

Provided herein are also methods for in situ waste impoundment remediation, comprising providing a waste impoundment with waste material therein, the waste impoundment comprising a perimeter and a bottom, the waste material contained within the impoundment having an upper surface, constructing a horizontal liner in situ at the bottom of the waste impoundment, and constructing a low permeability vertical containment wall at the perimeter of the impoundment. In some embodiments constructing a horizontal liner in situ at the bottom of the waste impoundment comprises advancing continuously overlapping large diameter augers from the upper surface of the waste material to a desired depth, and injecting a cementitious grout at the desired depth, whereby the cementitious grout solidifies to form a discrete horizontal liner at the bottom of the waste impoundment. In some embodiments this method can further comprise constructing a cover over the waste material in the impoundment, whereby the upper surface of the waste material is fully encapsulated in the impoundment by the horizontal liner, vertical containment wall, and cover. In some embodiments the horizontal liner, vertical containment wall, and cover together form a low permeability hydraulic barrier between the waste material and ground water. In some embodiments the low permeability hydraulic barrier has a permeability with a range of $1\times10^{-5}$ cm/sec to $1\times10^{-10}$ cm/sec, and wherein the unconfined compressive strength achieves a range of strengths designed to meet project requirements ranging as low as about 10 psi to greater than about several thousand psi.

In some embodiments the methods can further comprise preparing the site for in situ remediation, comprising assessment of the impoundment construction, groundwater assessment, geotechnical analysis, determination of cementitious grout materials, dewatering of the waste impoundment, and/or grading of the surface of the waste material. In some embodiments the continuously overlapping large diameter augers are advanced a plurality of times through the waste material to the bottom of the impoundment or underlying native material so that a continuous low permeability hydraulic barrier is formed. In some embodiments the cementitious grout comprises water and cementitious grout materials. In some embodiments the cementitious grout materials comprise waste specific cementitious grout materials. In some embodiments constructing a vertical containment wall at the perimeter of the impoundment further comprises forming in situ solidified columns within the perimeter of the impoundment, further comprising adjoining the horizontal liner at the bottom of the impoundment with the vertical containment wall. In some embodiments constructing a vertical containment wall at the perimeter of the impoundment enhances geotechnical stability by increasing embankment strength, reducing saturated conditions and increasing the overall factor of safety for slope failure. In some embodiments the horizontal liner can be contoured to facilitate groundwater/leachate monitoring and/or collection.

In some embodiments a system for hydraulically isolating waste material from groundwater by a hydraulic barrier between the waste material and ground water is provided. Such a system can in some embodiments comprise a machine for penetrating a waste material to a desired depth, wherein the desired depth comprises an area selected to construct a hydraulic barrier which isolates the waste material from the ground water, and a machine configured to apply a cementitious grout at the desired depth. Such a system can in some aspects form a low permeability hydraulic barrier between the waste material and ground water source. In some embodiments the low permeability hydraulic barrier comprises a low permeability discrete horizontal liner and vertical containment wall.

Accordingly, it is an object of the presently disclosed subject matter to provide methods, devices and systems for hydraulically isolating waste material from groundwater, enhancing geotechnical stability, and/or in situ waste impoundment remediation. This and other objects are achieved in whole or in part by the presently disclosed subject matter. Further, an object of the presently disclosed subject matter having been stated above, other objects and advantages of the presently disclosed subject matter will become apparent to those skilled in the art after a study of the following description and Examples.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, may be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

For a more complete understanding of the presently disclosed subject matter, reference is now made to the following drawings in which.

DETAILED DESCRIPTION

The presently disclosed subject matter now will be described more fully hereinafter, in which some, but not all embodiments of the presently disclosed subject matter are described. Indeed, the presently disclosed subject matter can be embodied in many different forms and should not be construed as limited to the embodiments set forth herein; rather, these embodiments are provided so that this disclosure will satisfy applicable legal requirements.

Waste impoundments, landfills, ash impoundments and the like are heavily regulated and under ever-increasing scrutiny in view of potential environmental impacts. Complying with the complex regulations presents a significant risk, and mitigating negative environmental impacts from waste impoundment failures and/or design flaws is an ongoing challenge. The disclosed in situ, i.e. in place, waste impoundment closure/remediation methods and systems are designed to mitigate the environmental risks and meet compliance requirements to the benefit of facility owners and other stakeholders.

One example application of the disclosed in situ or in place waste impoundment closure/remediation approach is at an ash impoundment, commonly located at coal fired electric power plants. For decades, operators of coal fired power plants have managed coal combustion residuals (CCRs) in ash impoundments, also referred to as ash landfills or ash ponds. There are at least two significant risks associated with these as impoundments: potential leaching of CCR contaminants, and structural instability. Most coal fired power plants and their associated ash disposal management facilities are constructed adjacent to rivers and other waterways for cooling water requirements and to allow discharge of water via National Pollutant Discharge Elimination System (NPDES) permit. Since at the onset of construction/operation of many of these impoundments there were no regulatory requirements to construct liners, many of these remain unlined.

In an unlined waste impoundment or landfill the contents (e.g. waste or CCRs) are directly in contact with the underlying soil, hydrogeologic formations (or units), and groundwater. The lack of a liner allows the migration of groundwater through the ash (or other waste material); potentially leaching CCR related contaminants (or other environmentally hazardous compounds) into the groundwater. Indeed, groundwater impacts have been documented at several ash impoundments. In addition, because most impoundments are constructed with earthen berms there are concerns with long term structural stability and the potential for the impoundments to fail, thereby causing releases such as the failure that occurred at the Tennessee Valley Authority's Kingston Fossil Plant in 2008.

Moreover, the size and depth of some impoundments can range from as small as 1 acre to thousands of acres and depths from several feet to hundreds of feet. When previously unlined or inadequately lined or reinforced, there is a significant challenge in creating a hydraulic barrier or fully remediating the entire contents, given the shear size. The disclosed in situ waste remediation methods and systems process does not have size limitations, but in some instances does have an effective depth capacity. Based on current technology and equipment the depth can be up to about 70 feet.

Stakeholders, including ash impoundment owners, regulators, environmental groups, and the general public, continue to seek an appropriate closure/remediation approach for these ash impoundments. Current closure strategies range from simply capping the ash impoundments to eliminate infiltration and reduce potential leaching of CCR contaminants into the groundwater, to complete removal of the ash from the impoundment and relocation in a newly constructed lined landfill. The new regulatory framework, 40 CFR, Part 257, Subpart D, further complicates the situation and includes imposing requirements that are difficult to meet without implementing more complex and costly solutions that may also introduce new risks.

These concerns are applicable and persist at other facilities including, but not limited to, waste impoundments for mine tailings and drill cuttings, confined disposal facilities for dredged sediments, acid tar lagoons, and abandoned municipal landfills. Thus, the disclosed in situ waste impoundment remediation methods and systems are applicable to and useful for these types of waste impoundments and storage structures in addition to ash impoundments.

Many waste impoundments are of similar construction. Commonly, they comprise one or more of the following features: constructed as large scale basins, surrounded by soil berms or dikes to create storage for waste; constructed to discharge decant water to a receiving body of water through a permitted NPDES outfall or other permitted discharge; sometimes sited on natural depressions or ravines to increase storage capacity; and often constructed without a liner, particularly in older impoundments. Consequently, there are common concerns and technical challenges for remediation/closure of the impoundments that can include the following: waste fill located below the water table can serve as a continual source for leaching of waste constituents to groundwater (e.g., volatile organic compounds, boron and sulfate, trace metals, etc.); placement of saturated waste within the impoundment can lead to an increase in hydraulic head (i.e., water level) above the naturally occurring groundwater table, which can exacerbate leaching of waste constituents; historic infrastructure near and within waste impoundments (e.g., abandoned storm water pipes, abandoned discharge structures) can serve as potential migration pathways for leaching from the impoundment to surface water and groundwater and also contribute to geotechnical instability; and, saturated and differential hydraulic conditions in and outside of the impoundment can potentially compromise impoundment geotechnical stability along surface water bodies (e.g., adjacent river).

To fully resolve these technical challenges and considerations, the waste must be hydraulically isolated from the groundwater and the geotechnical strength characteristics maintained or enhanced to decrease the potential for instability. Such a need has not previously been met in a manner such as disclosed herein.

While construction of a final cover can be a presumptive low cost closure strategy often considered by facility owners of non-compliant waste impoundments, this technology alone is unlikely to be accepted by other stakeholders as there may be continued leaching of waste constituents into surrounding groundwater. Such an approach only serves to seal or enclose the upper surface of a waste impoundment, and fails to consider the above-noted considerations and concerns. In addition, this approach may not be compliant with all regulations as it does not address the barrier between the waste and surrounding soil and/or geological material. This is exemplified, for example, by a recent North Carolina Superior Court Decision wherein the court reversed a ruling by the North Carolina Environmental Management Commission and determined that utilities must take immediate action to eliminate sources of groundwater contamination at ash impoundments. Most companies are now considering construction of new lined facilities and moving ash from non-compliant impoundments to new compliant sites. This approach would be disadvantageous in several ways: it is costly, there is risk in moving the material, and the timeline for the solution is expected to be long due to permitting and other complications.

The disclosed in situ waste impoundment remediation methods and systems can in some embodiments eliminate leaching and reduce geotechnical instability that contributes to impoundment failures. This can in some embodiments be achieved by hydraulically isolating the waste material from the groundwater by constructing a hydraulic barrier at the perimeter and at the bottom of the impoundment using engineered in situ solidification (ISS) applications on the waste and/or underlying natural material. Such ISS applications can in some embodiments also enhance geotechnical stability by increasing embankment strength, reducing saturated conditions and increasing the overall factor of safety for slope failure.

In some embodiments, an effective hydraulic barrier can be constructed at the base and the sidewalls of the impoundment or pond, (e.g. ash impoundment) using ISS techniques on the waste, embankment material, and/or underlying native material. That is, the barrier can in some embodiments be installed underneath the waste within the impoundment, at the interface between the waste and underling native soil, or at the bottom of the impoundment including both the waste and native soil, while the waste is still in place. The end result can be a solidified and geotechnically stabilized encapsulation of the waste within a cured monolithic hydraulic barrier on the bottom and/or perimeter of the waste impoundment (i.e., a perimeter wall constructed using in situ solidification/stabilization, slurry wall, sheet pile wall, etc). This configuration can reduce hazards by isolating the waste from the surrounding soil and/or geological material, hydrogeologic formations, and groundwater.

The ISS technique can in some embodiments comprise advancing continuously overlapping large diameter augers (e.g., about 4 feet to about 12 feet) from ground surface or surface of the waste in the impoundment to the desired depth (impoundment bottom) or at discreet intervals while injecting a waste/soil specific engineered cementitious grout that is blended with the waste/soil in situ. In some embodiments the cementitious grout can comprise water, hydraulic cements (e.g., Portland, ground granulated blast furnace slag, pozzolans, etc.) and admixtures (e.g., bentonite, cement kiln dust, lime, lime kiln dust, limestone, gypsum, phosphate mixtures, retarders, accelerators, air-entraining agents, water reducers, superplasticizers, anti-washout, fillers, and other proprietary admixtures) designed to mix with geologic materials (soil, sediment, rock) and/or waste to reduce hydraulic conductivity and increase the unconfined strength of the resulting mixture.

In most instances, prior to remedy implementation, a laboratory treatability study can be conducted to select and test appropriate cementitious grout materials, cementitious grout proportions, and/or application rates with the objective of designing an engineered grout specific to the waste and waste constituents targeted for solidification. Laboratory testing of the waste/soil and engineered grout mixture can be used to confirm that the selected cementitious grout materials, cementitious grout proportions, and/or application rates can successfully solidify the waste/soil material and meet established performance goals. Such performance goals can, for example, comprise unconfined compressive strength (UCS), hydraulic conductivity, and/or reduced leaching rate and concentration of leachate. Following laboratory confirmation, a pilot scale evaluation can in some cases be implemented at the waste site to verify laboratory results are indicative of in-field conditions, and to identify potential operational problems and evaluate operational parameters such as auger diameter and vertical advancement rate. In-field construction success during pilot scale and remedy implementation can be measured by the collection of construction quality assurance (CQA) samples, such as for example discrete samples of the waste/soil and/or engineered grout mixtures. Such samples can be collected and tested to evaluate compliance with established strength and permeability requirements.

Using this technology a permanent in-place remedy that mitigates groundwater impacts can be achieved in a relatively short timeframe. In addition, ISS can be effectively constructed to enhance geotechnical stability. Tailored engineered grout mix designs can be developed to improve strength and stability of waste impoundment embankments.

Applicant has successfully tested discrete ISS or ISS at a selected depth interval or zone. Unlike ISS where engineered cementitious grout is mixed with soil/waste continuously from the ground surface to a desired depth, application of discrete ISS applies the engineered cementitious grout only to the depth where the cementitious grout treatment is needed or desired. This strategy utilizes ISS at a discrete or desired depth to specifically solidify the waste and/or native material to create a low permeable barrier at the bottom of an existing impoundment to isolate the waste within the impoundment from groundwater and significantly reduce leaching. Concurrently, in some embodiments fully penetrating conventional ISS columns or other containment techniques (e.g., slurry wall, sheet pile wall) can be constructed at the impoundment perimeter to strengthen the embankment sidewalls to reduce geotechnical instability and connect into the low permeability barrier or liner at the impoundment bottom.

Applicant has conducted a discrete ISS pilot test on a manufactured gas plant (MGP) site. Remedial applications of ISS at waste sites and treatability studies on coal ash and other industrial residuals and wastes have been conducted. The results of these pilot tests and treatability studies demonstrate that an effective hydraulic barrier can be constructed at the base of a waste impoundment from the waste and/or underlying natural material. Further details of the disclosed methods and systems are illustrated and described below.

In some embodiments ISS can be used at waste sites (e.g., former MGP sites and the petroleum industry) to isolate impacted media from groundwater and reduce leaching of contaminants of concern. ISS can also be effective in solidifying/stabilizing coal ash, contaminated sediments, mining wastes, acid tar wastes, and drill cuttings. ISS can achieve specified strengths (e.g., greater than about 50 psi) and hydraulic conductivity endpoints (e.g., less than about $1 \times 10^{-6}$ cm/sec). In some embodiments the unconfined compressive strength achieves a range of strengths designed to meet project requirements ranging as low as about 10 psi to greater than about several thousand psi.

Figure 1:
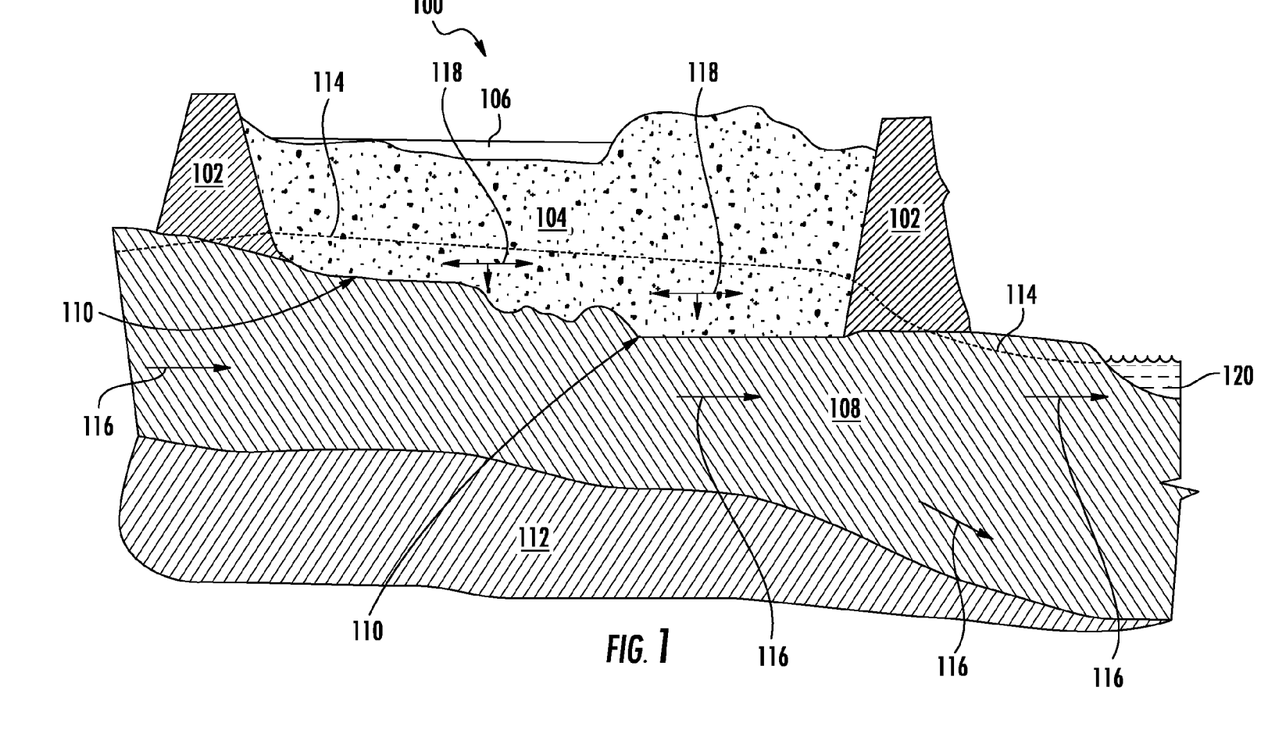
FIG. 1 is a cross-sectional view of a waste impoundment prior to application of the disclosed in situ waste remediation methods and systems process.

FIG. 1 is a vertical cross-sectional view of an exemplary waste impoundment 100 that is unlined and prior to application of the disclosed in situ waste remediation methods and systems process. In some embodiments a waste impoundment 100 can comprise an ash impoundment with earthen impoundment berms 102 erected vertically above underlying native soil 108 or other native geological material. Earthen impoundment berms 102 can act as containment walls to hold in a defined area a waste material 104, such as for example CCR. Such an impoundment 100 can have standing water 106 on top of the waste material 104. In some instances the water table 114 can be above the bottom 110 of the impoundment 100. In the absence of a liner or hydraulic barrier at the bottom 110 (or interface between the waste material 104 and underlying native soil 108 and/or bedrock 112), there is nothing to prevent leachate from saturated waste below the water table 114 and above the impoundment bottom 110 from entering the groundwater, particularly where the water table 114 is above the bottom 110 of the impoundment 100 which can result in horizontal and vertical leachate migration 118 into the underlying groundwater. Where leachate migration 118 is present the leachate can enter the groundwater via a groundwater transmissive zone 116 in the native soil 108.

Since waste impoundments such as impoundment 100 in FIG. 1 are often located near a body of water, such as for example a river 120, the geotechnical stability of earthen impoundment berms 102 can be important to prevent slope failure and loss of containment of waste material 104 since such a failure could result in contamination of the body of water 120 and surrounding areas.

Figure 2:
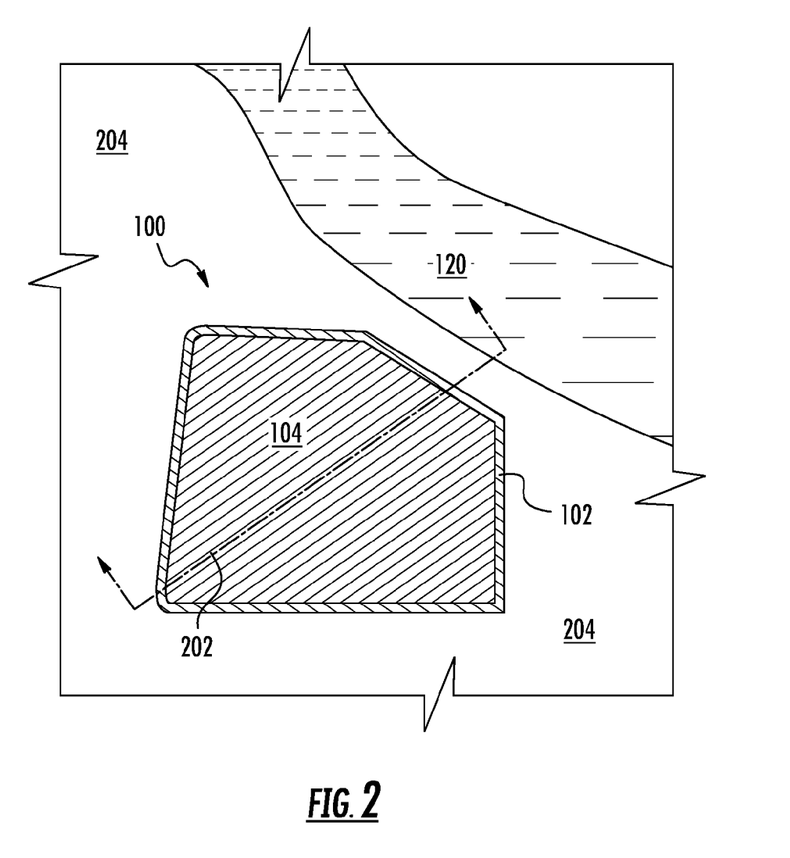
FIG. 2 is an overhead view of a waste impoundment.

FIG. 2 is an overhead view of a waste impoundment 100 containing waste material 104 constructed with earthen impoundment berms 102 and adjacent to a body of water, for example a river 120. The vertical cross-sectional view depicted in FIG. 1 can be taken from cross-section 202 for example. Generally the waste impoundment 100 and earthen impoundment berms 102 can be elevated as compared to surrounding land 204.

Figure 3:
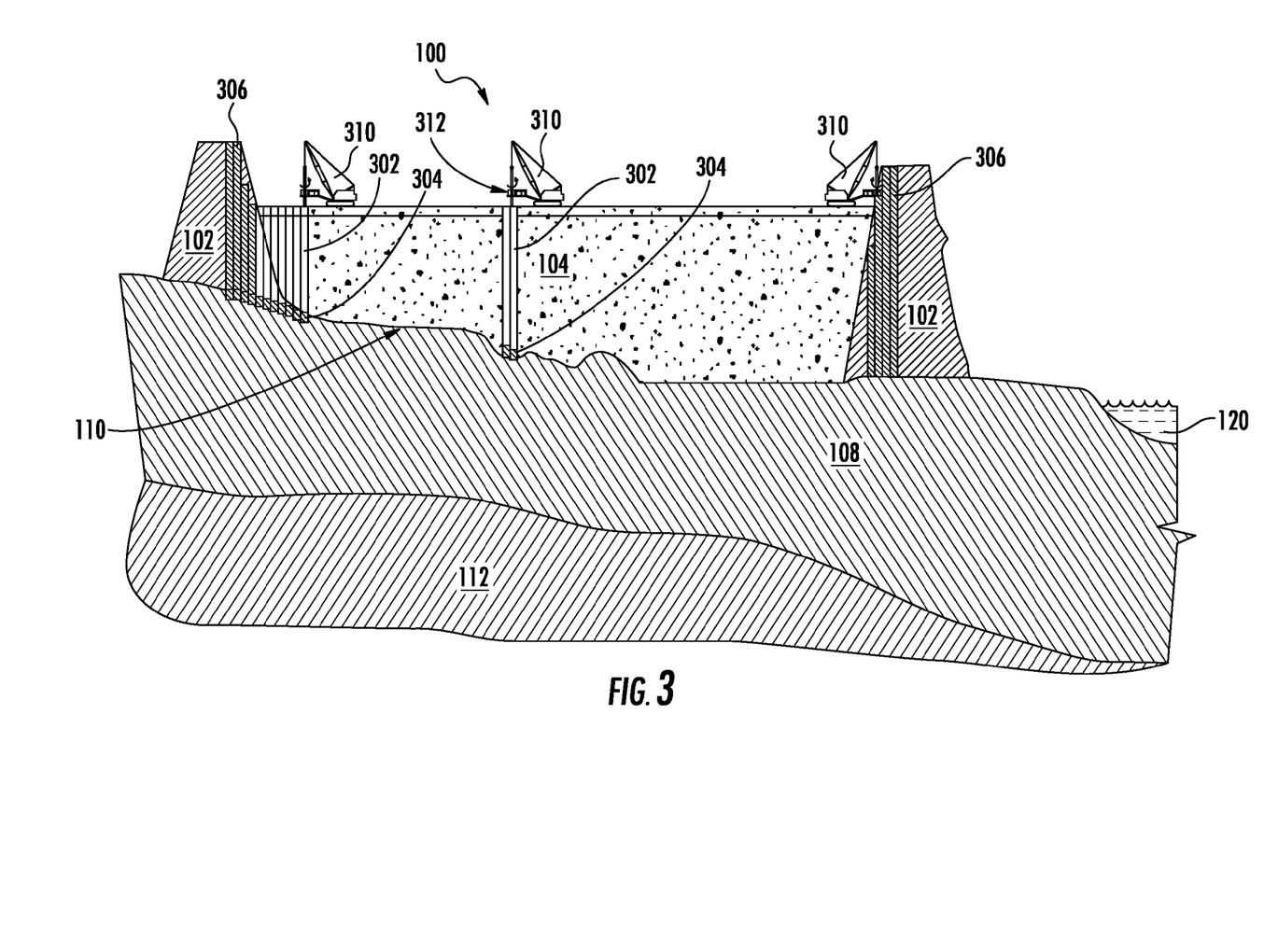
FIG. 3 is a cross-sectional view of an unlined waste impoundment undergoing the disclosed in situ waste remediation methods and systems.

FIG. 3 is a cross-sectional view of the unlined waste impoundment 100 in FIGS. 1 and 2 containing waste material 104, with earthen impoundment berms 102, with underlying native material 108 and 112, and undergoing the in situ waste remediation methods and systems process disclosed herein. In some embodiments, waste material 104 can be hydraulically isolated from the groundwater and the geotechnical strength characteristics maintained or enhanced to decrease the potential for instability utilizing ISS techniques to create a horizontal barrier 304 and vertical barrier 306.

Such horizontal barriers 304 are constructed using conventional ISS equipment 310 (or machines) and discrete ISS techniques to specifically solidify the waste 104 and/or native material 108 to create a low permeable barrier at the bottom 110 of an existing impoundment 100 to isolate the waste within the impoundment from groundwater and significantly reduce leaching. Discrete ISS techniques apply engineered cementitious grout to the specified target zone 304, not the overlying material 302, to create a low permeability barrier 304.

Such vertical barriers 306 are constructed utilizing conventional ISS techniques and equipment 310 (or machines) where engineered cementitious grout is mixed with soil 102/waste 104 continuously from the ground surface to a desired depth. In some embodiments the conventional ISS columns 306 can be constructed at the impoundment perimeter to strengthen the embankment sidewalls to reduce geotechnical instability and tie connect into the low permeability barrier or liner 304 at the impoundment bottom 110. In some embodiments other containment techniques (e.g., slurry wall, sheetpile wall, etc) can be used to create the vertical barriers 306.

Such conventional ISS equipment 310, can include but are not limited to hydraulic powered drill rigs (e.g. Delmag) or crane mounted diesel powered equipment (e.g. Steven M. Hain Co.) capable of rotating long (e.g. 100 feet) drilling shafts (e.g. Kelly Bars) 312 and penetrating large diameter augers (e.g., about 4 feet to about 12 feet) while injecting and mixing specific engineered cementitious grout with the waste/soil in situ. Such equipment can complete construction of horizontal barriers 304 and vertical barriers 306 utilizing ISS techniques. The systems disclosed herein for hydraulically isolating waste material from groundwater by a hydraulic barrier between the waste material and ground water can utilize such equipement and machines. For example, such a system can in some embodiments comprise a machine for penetrating a waste material to a desired depth, wherein the desired depth comprises an area selected to construct a hydraulic barrier which isolates the waste material from the ground water, and a machine configured to apply a cementitious grout at the desired depth. Such systems can in some aspects form a low permeability hydraulic barrier between the waste material and ground water source.

Figure 4:
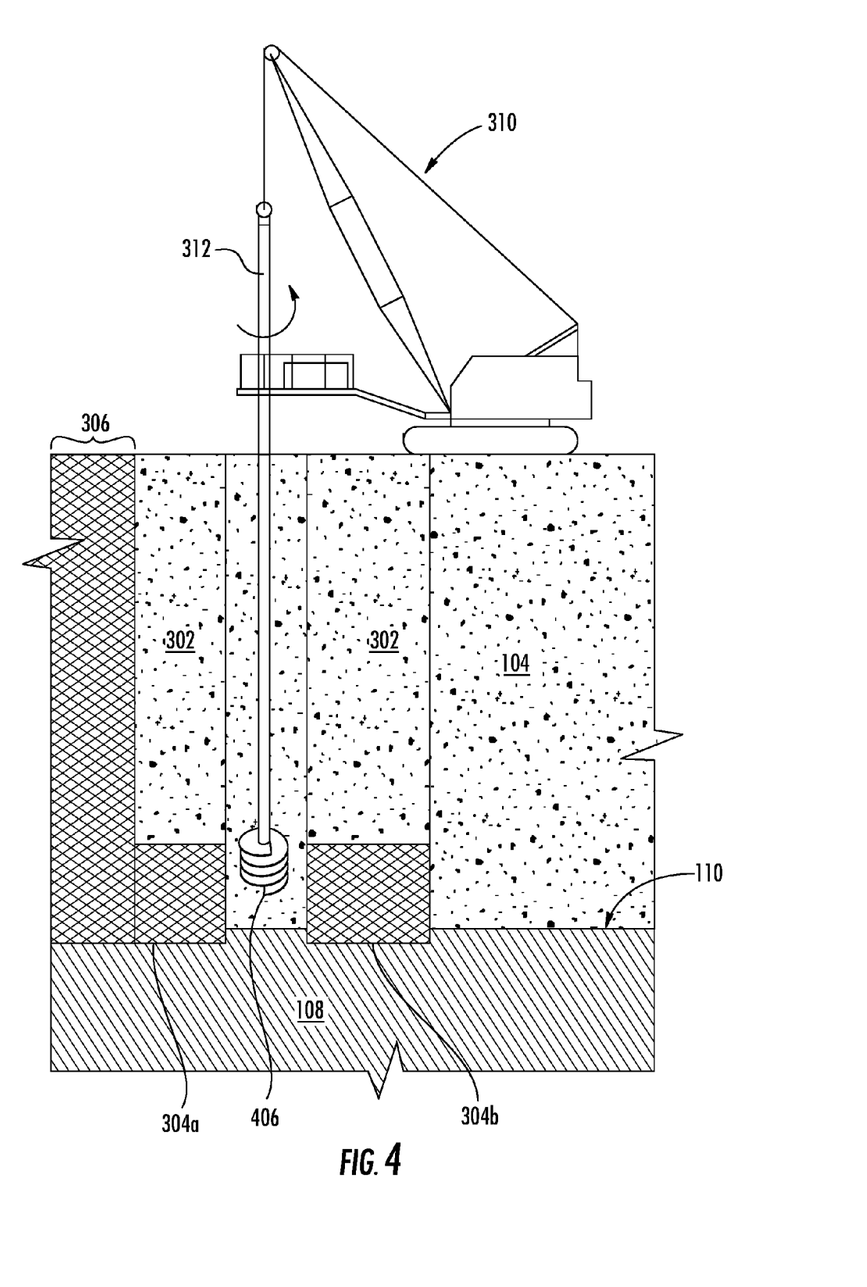
FIG. 4 is a cross-sectional view and detail of waste material in an impoundment undergoing fully penetrating and discrete ISS during the disclosed in situ waste remediation methods and systems process.

FIG. 4 is a cross-sectional view detail of waste material in an impoundment undergoing conventional fully penetrating and discrete ISS during the in situ waste remediation methods and systems process disclosed herein. The cross-sectional illustration shows ISS equipment 310 and 312 constructing fully penetrating in situ ISS techniques through waste material 104. The fully penetrating in situ ISS technique is applied to mix engineered cementitious grout in situ from the ground/embankment/impoundment waste surface to a desired depth, for example to the underlying native material 108, to create a vertical barrier 306. The discrete in situ ISS technique advances augers through the overlying waste material 302 and mixes/applies engineered cementitious grout in situ at a desired discrete interval 304a, 304b only to construct a horizontal barrier, while leaving the overlying waste material 302 in its original state. This illustration also shows the ISS equipment 310 and 312 in the process of constructing a horizontal barrier 304. The drilling shaft 312 and penetrating large diameter auger 406 have been advanced to the targeted elevation and are prepared to mix/apply engineered cementitious grout in situ at the specified target zone to construct a low permeability horizontal barrier.

Figure 5:
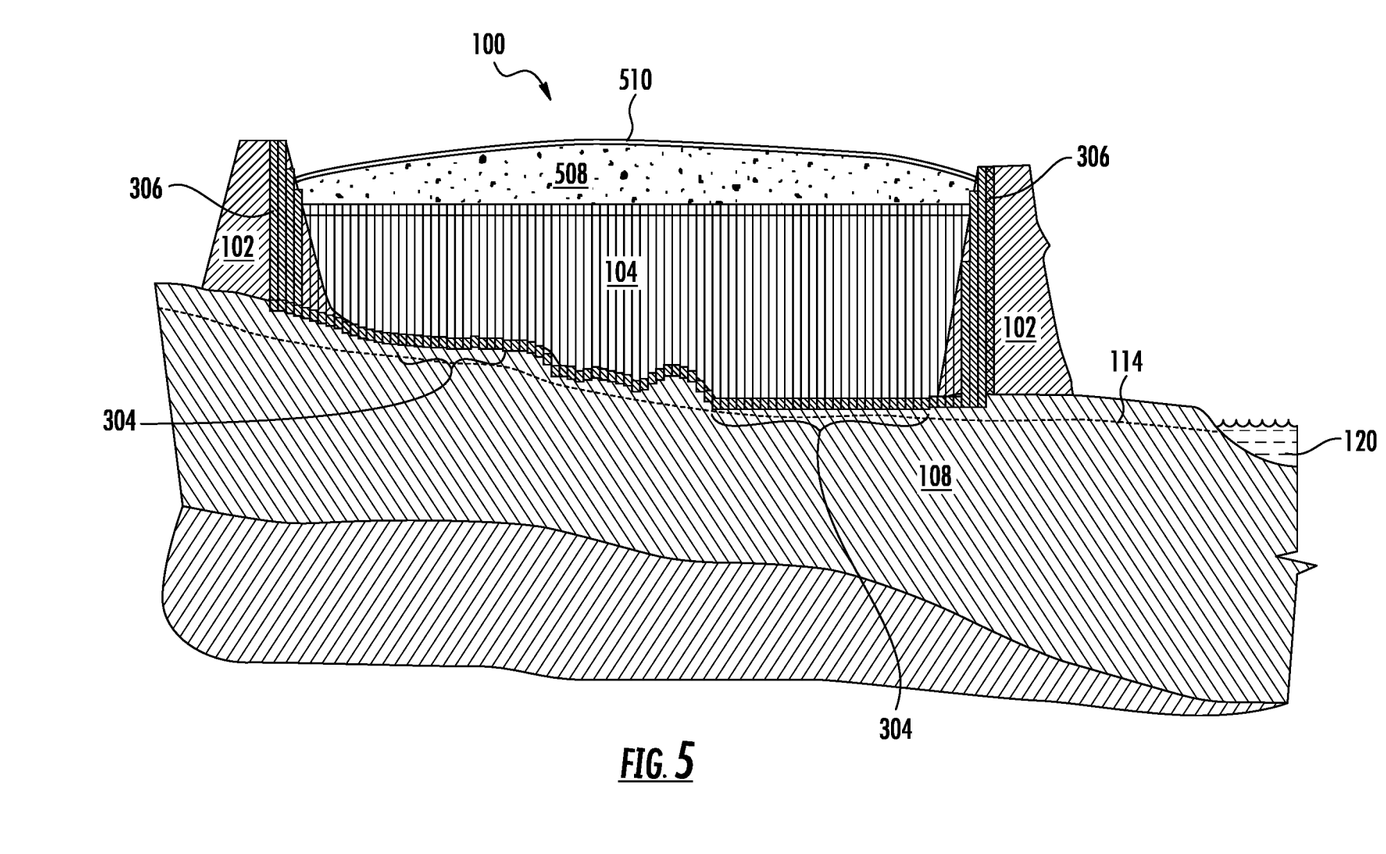
FIG. 5 is a cross-sectional view and detail of a waste impoundment after application of the disclosed in situ waste remediation methods and systems process.

FIG. 5 is a cross-sectional view of the waste impoundment 100 from FIGS. 1, 2, 3 and 4 after application of the disclosed in situ waste remediation methods and systems process. The waste material 104 has been hydraulically isolated within the impoundment utilizing the disclosed enclosure/remediation methods and systems. Utilizing conventional fully penetrating ISS techniques, a vertical barrier 306 was constructed in the earthen embankments 102 to isolate the waste and strengthen the embankment sidewalls to reduce geotechnical instability and complete the connection with the low permeability horizontal barrier 304. Utilizing discrete ISS techniques, a low permeability horizontal barrier 304 isolates the waste within the impoundment from groundwater and significantly reduces leaching.

To complete encapsulation of the waste material 104, in some embodiments a cover is constructed by importing fill (or on-site borrow materials) to raise the impoundment to an appropriate subgrade 508, constructing the cover with low permeability materials 510 (e.g., geomembrane, compacted clay), and/or construction of a soil layer designed to protect the low permeability layer. The low permeability cover can also be constructed by applying ISS techniques using the available surficial waste.

Figure 6:
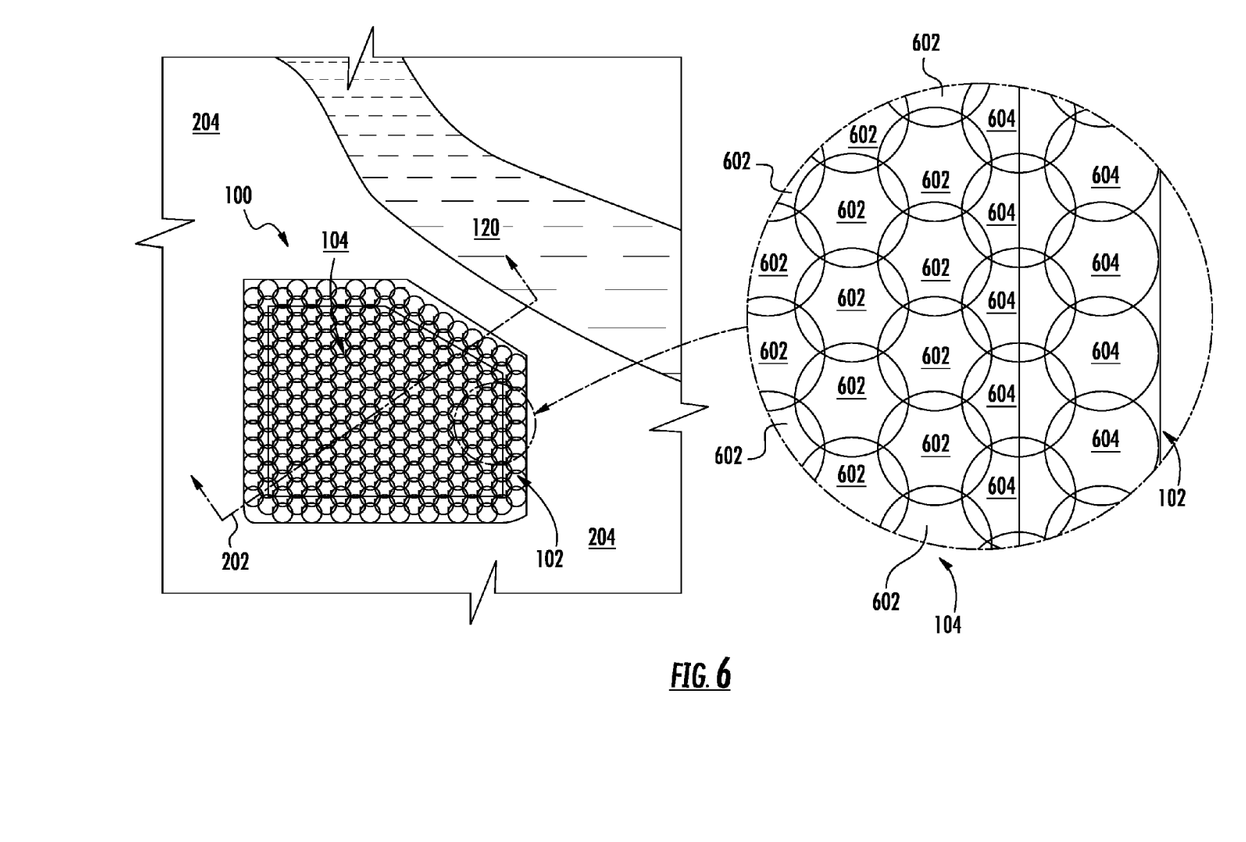
FIG. 6 is an overhead view and detail of a waste impoundment showing the overlapped application of the in situ waste remediation methods and systems process and continuous application of the discrete liner.

FIG. 6 is an overhead view and detail of a waste impoundment showing the overlapped application of the disclosed in situ waste remediation methods and systems process and continuous application of the discrete liner. The continuous application is constructed by overlapping large diameter augers (e.g. 4 to 12 feet in diameter) ISS columns throughout the entire overhead view of a waste impoundment 100, as shown on FIG. 6. This overhead view can be taken from FIG. 2 and shows the ISS columns taken from FIG. 3 constructed in an overlapped pattern 602 (shown as 302 and 304 from FIG. 3) and 604 (shown as 306 from FIG. 3) to create a continuous discrete liner.

In addition, ISS columns 306, constructed from the ground or embankment or impoundment waste surface to a desired depth, for example to the underlying native material 108, create a vertical hydraulic barrier at the perimeter of the impoundment and in some embodiments strengthen the embankment sidewalls to reduce geotechnical instability. The vertical barrier ISS columns 306 tie into the low permeability barrier or liner 304 at the impoundment bottom to create a continuous barrier.

In some embodiments disclosed herein are systems and methods for evaluating and implementing an ISS remedy to facilitate waste impoundment closure/remediation. For example, in some embodiments a first phase (phase I) can comprise a waste impoundment investigation and constructability evaluation. Such a phase can in some embodiments comprise a records review to develop an understanding of an impoundment construction such that an appropriate closure/remediation plan can be developed. For example, pre-design data can be collected for laboratory treatability studies and geotechnical testing. Additionally, a constructability evaluation can be completed and selection of a final cover/ISS liner remedy including groundwater assessment and geotechnical analysis can be completed. In some embodiments, an evaluation of waste impoundment dewatering requirements and options may be desired, including discharge options, treatment options, on-site management options, and waste contact water reuse during the implementation of the disclosed in situ waste remediation methods and systems. Finally, ISS laboratory treatability studies to determine appropriate cementitious grout materials, cementitious grout proportions, and application rates can be completed, and an evaluation to verify compliance with performance criteria/construction parameters (e.g., permeability, strength, leaching) can be completed. Such steps can be completed for example at an ash impoundment as depicted in FIGS. 1 and 2, or any other waste impoundment, landfill or similar waste facility.

In some embodiments a second phase (phase II) can comprise site preparation. Particularly, initial construction steps can be completed to prepare the impoundment in FIGS. 1 and 2 for ISS construction. Such steps can include partial or complete dewatering of the waste impoundment and grading to establish a stable construction platform for ISS construction operations. Dewatering activities of the waste impoundment can in some aspects be concurrent with ISS construction and continued until post-closure/remediation to further reduce water within the impoundment.

In some embodiments a third phase (phase III) can comprise ISS construction. As illustrated in FIGS. 3 and 4, such ISS construction can comprise the construction of a horizontal liner at the bottom of the impoundment and perimeter vertical containment and structural integrity fortifying walls. Construction of the ISS horizontal liner can in some embodiments be performed by advancing an auger to the desired depth below the impoundment and performing discrete ISS to construct the liner (e.g., permeability less than about $1 \times 10^{-5}$ cm/sec, or in some embodiments about $1 \times 10^{-6}$ cm/sec). In some embodiments the low permeability hydraulic barrier can have a permeability low enough to achieve hydraulic waste isolation based on actual field conditions. The constructed horizontal liner can be tied into a surrounding vertical barrier constructed of fully penetrating ISS columns from ground surface through the waste or surrounding native material to prevent potential horizontal migration of groundwater through the impoundment and provide structural stability. The result can prevent both the vertical and horizontal migration of groundwater through the waste impoundment, effectively isolating the waste material. In addition, the constructed horizontal liner can in some embodiments be contoured to facilitate groundwater/leachate monitoring and/or collection.

In some embodiments a fourth phase (phase IV) can comprise cover construction. As illustrated in FIG. 5 for example, the design and construction of a cover designed to cap the impoundment can be completed. The cover can in some embodiments be constructed by importing fill (or on-site borrow materials) to raise the impoundment to an appropriate subgrade, constructing the cover with low permeability materials (e.g., geomembrane, compacted clay), and/or construction of a soil layer designed to protect the low permeability layer. The low permeability cover can also be constructed by applying ISS techniques using the available surficial waste. In some embodiments the final cover can in some embodiments have permeability lower than the liner (achievable with readily available materials) and can result in reduced surface water infiltration to the encapsulated waste.

In some embodiments additional phases or steps can comprise the preparation and implementation of a post-closure monitoring plan. The plan can include groundwater monitoring and structural inspections. In addition, land use restrictions can be placed limiting future use of the encapsulated impoundment.

The disclosed in situ waste remediation methods and systems can in some embodiments provide for in-place closure of waste impoundments if needed. Such methods and systems can effectively isolate waste from groundwater and provide structural stability to the impoundment perimeter and can therefore be more effective than simply capping the impoundment. This closure/remediation strategy can also be a less environmentally disruptive approach than excavation and on-site or off-site disposal.

The disclosed in situ waste remediation methods and systems can impact a number of stakeholders, with the primary stakeholder groups including waste impoundment owners, regulators, environmental groups, and the general public. Impoundment owners include utility companies, municipalities, government entities and public and private corporations. Regulators primarily include federal and state environmental agencies and the public utility commissions. Many environmental groups are actively involved in impoundment rule making. The general public is a primary stakeholder with respect to health and safety and may have monetary obligation as well; for example utility rates may be affected by rule making and the cost of impoundment closures.

The disclosed in situ waste remediation methods and systems can address stakeholder concerns as summarized below.

For impoundment owners, their primary concerns and objectives can comprise achieving regulatory requirements; addressing concerns of environmental groups and the general public; providing the lowest possible cost to rate payers and/or shareholders; and performing timely closures. The disclosed in situ waste remediation methods and systems meet these objectives by providing a safe, cost effective way to remediate waste impoundments in a timely way, and by supporting the safe and timely closure of obsolete impoundments and offering a path for extending life of impoundments in use if required and permitted.

For regulators, their primary concerns and objectives can comprise securing impoundments to prevent catastrophic failure and leaching of waste constituents into groundwater and surface water; timely implementation of sustainable closures; and the implementation of cost effective remedies that meet regulatory requirements (particularly for public utility commissions). The disclosed in situ waste remediation methods and systems can in some embodiments meet these objectives by providing structural stability of impoundments and mitigating leaching via installation of vertical hydraulic and structural fortifying barriers, a horizontal hydraulic barrier/liner, and a cap. Moreover, closures can be implemented in-place thereby reducing potential environmental impacts of siting and permitting new landfills, waste handling, waste transportation, etc.

Furthermore, remediation can be implemented in a timely way, thereby reducing windows of risk.

For environmental groups, their primary concerns and objectives can comprise insuring structural stability of impoundments to protect nearby bodies of water; and preventing leaching of waste constituents into groundwater and surface water. The disclosed in situ waste remediation methods and systems can in some embodiments meet these objectives by addressing the primary concerns of environmental groups related to structural stability and continual groundwater impacts. Furthermore, the disclosed methods in situ waste remediation methods and systems have the added advantage of timely implementation and in-place solutions which is more environmentally friendly due to elimination of the need for additional development of compliant landfills. Finally, there can be a reduction of the carbon footprint of solution by eliminating waste excavation and transportation.

For the general public, the primary concerns and objectives can comprise addressing safety issues in a cost effective way that also minimizes impact on utility rates, for example. The disclosed in situ waste remediation methods and systems can in some embodiments meet these objectives by addressing perceived safety issues through timely resolution and significant reduction in risk of contamination through leaching or failure. This also provides the lowest cost closure thereby minimizing impact on rates.

Definitions

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one of skill in the art.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms "a", "an", and "the" refer to "one or more" when used in this application, including the claims. Thus, for example, reference to "a cell" includes a plurality of such cells, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods and systems.

The term "comprising", which is synonymous with "including" "containing" "comprise" "comprises" or "characterized by" is inclusive or open-ended and does not exclude additional, unrecited elements or method steps. "Comprising" is a term of art used in claim language which means that other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

As used herein the term waste impoundment or impoundment includes, but is not limited to, any confined or unconfined waste management unit or disposal facility such as for example landfills, ash impoundments, lagoons, and pits.

The term in situ as used herein in the context of encapsulation and/or remediation methods and systems for waste impoundments refers to the application and/or installment of a hydraulic barrier, encapsulation and/or reinforcement while the waste material is in place, i.e. in the impoundment. This in situ application, or in situ solidification/stabilization (ISS), allows for the discrete application of a barrier under or around existing waste material and precludes the necessity of ISS application to all of the waste material or to remove or relocate the waste material to allow for application of the barrier/reinforcement.

The terms "solidification" and/or "stabilization" as used herein in the context of encapsulation and/or remediation methods and systems for waste impoundments refers to the formation of a solid or substantially solid high strength and low permeability barrier, and/or improving the strength and/or permeability of an existing barrier or structural formation.

The term "admixture" as used herein is defined as any material other than hydraulic cements, water, aggregates that are added during the ISS process.

The term "hydraulic cement" as used herein is defined as composite material that consists essentially of cementitious material (Portland cement and supplementary cementitious materials such as fly ash, ground granulated blast furnace slag, other pozzolans), aggregates (coarse and fine), and water and/or chemical admixtures.

EXAMPLES

The following examples are included to further illustrate various embodiments of the presently disclosed subject matter. However, those of ordinary skill in the art should, in light of the present disclosure, appreciate that many changes can be made in the specific embodiments which are disclosed and still obtain a like or similar result without departing from the spirit and scope of the presently disclosed subject matter.

Example 1

Evaluation of In Situ Solidification/Stabilization (ISS) Methods

ISS methods were evaluated and tested for the in-place mechanical mixing of contaminated media with dry reagent or an injected engineered grout mixture. This resulted in a monolithic structure with increased strength and stability and decreased permeability.

The reagents used and tested included Portland cement, ground granulated blast furnace slag (GGBFS), and bentonite. The construction techniques used and tested included full depth ISS as well as the presently disclosed discrete zone ISS where the application of engineered grout was only at select and discreet locations of the ISS column, (e.g. at the bottom).

The performance goals assessed included decreased permeability (e.g. $\leq 1 \times 10^{-6}$ to $1 \times 10^{-7}$ cm/sec), increased compressive strength (e.g. $\geq 50$ psi), and reduced leaching to meet regulatory requirements.

Example 2

Development of Discrete In Situ Solidification/Stabilization (ISS) Method

At a former Gasification Plant Site (Site) in Sanford, Fla. in situ stabilization/solidification (ISS) was selected by the United States Environmental Protection Agency (USEPA) to address remaining soil and groundwater contamination from historic manufactured gas plant (MGP) operations. Contaminant conditions at the site included coal tar that occurred in discrete zones and various depths overlain by uncontaminated soils. These impacted zones were only 2 to 4 feet thick and were overlain with up to 15 to 25 feet of uncontaminated soil (overburden). Application of conventional ISS through these uncontaminated zones posed concerns for significant cost increases due to the additional quantity of uncontaminated soil that would require mixing cementitious grout through the uncontaminated soil to reach the target discrete depth intervals. To address this concern, ISS applications using discrete drilling techniques were evaluated as a part of the pilot test program conducted prior to full scale construction.

Cementitious grout mix designs consisting of cement, granulated ground blast furnace slag (GGBFS), and bentonite were designed to solidify/stabilize the discrete zone during pilot testing. The following evaluations, as they relate to the disclosed systems and methods, were made during the discrete mixing test:

1. Could the large diameter augers used for conventional ISS mixing be advanced effectively through clean overburden soil?
2. What types and amounts of alternate drilling fluids would be required and would they be effective in preventing clogging of injector ports during advancement through the clean overburden?
3. Would the presence of alternate drilling fluids result in dilution of the ISS cementitious grout that would prevent meeting performance criteria?
4. Would the use of alternate drilling fluids unacceptably destabilize the clean overburden soil and limit access by heavy equipment and/or detrimentally affect future land use?

Three different types of alternate drilling fluids were selected for evaluation:

1. Water: Water was selected based on past demonstrated performance on conventional geotechnical drilling and stabilization applications.
2. Guar Gum and Water Mix: Biodegradable guar gum mixed with water is also a conventional drilling fluid used in geotechnical drilling applications.
3. Lean Cementitious Grout Mix: The lean grout mix was essentially the cementitious grout mix designed for the ISS construction, but the percent amendment applied to the overburden soil was approximately 2%, rather than the design application of 8% for complete solidification/stabilization of the discrete zone.

Based on the field observations made during the discrete mixing test and field and laboratory data the following conclusions were made:

1. All three of the alternate drilling fluids applied were demonstrated effective to advance the auger through uncontaminated overburden without clogging auger injector ports.
2. Of the three fluids tested, water required the largest volume to complete the advancement and extraction from the zone targeted for ISS; increasing the pressure or pressurizing the water injection could alleviate some of the volume needed.
3. The large amount of water required for the discrete mixing may have diluted the cementitious grout in the discrete zone which may have contributed to the lower unconfined compressive strengths were obtained for discrete mixing with water as the alternate drilling fluid.
4. The discrete zone mixing was successful in meeting the performance criteria for strength and hydraulic conductivity in the discrete mixing zones.
5. All pilot test locations indicated adequate stability/bearing capacity for heavy equipment operations with 24 hours after the discrete mixing test.
6. Other alternate drilling fluids, (e.g. pressurized air and/or water) could be used.

The discrete zone mixing test was successful in advancing large diameter augers through the clean overburden soils and comleting and targeting specific zones for ISS mixing and meeting performance criteria.

Example 3

Application of ISS on CCR

Baseline laboratory treatability testing for ISS on Class F CCR was designed and completed. The testing included:

1. CCR material property testing, both physical and chemical.
2. Cementitious grout materials and proportion selection (e.g. Portland cement, ground granulated blast furnace slag, bentonite)
3. Performance testing (e.g. hydraulic conductivity, unconfined compressive strength).

The testing results are presented in the Table 1 below:

TABLE 1

| Grout Cementitious Grout Materials and Proportions | 10% Portland Cement 0.5% Bentonite | 7.5% GGBFS 2.5% Portland Cement | | 8% Portland Cement | | 6% GGBFS 2% Portland Cement | | 18% GGBFS 8% Portland Cement 0.5% Bentonite | | 6% Portland Cement 2% Bentonite | |
|---|---|---|---|---|---|---|---|---|---|---|---|
| Curing Days Prior to Testing | 14 | 14 | | 14 | 28 | 14 | 28 | 14 | 28 | 14 | 28 |
| Moisture Content (%) (pretreatment) | 31 | 31 | | 37 | 37 | 37 | 37 | 37 | 37 | 23.5 | 23.5 |
| Density (lbs/ft$^3$) (pretreatment) | 102 | 102 | | 97.63 | 97.63 | 97.63 | 97.63 | 97.63 | 97.63 | 97.63 | 97.63 |
| Unconfined Compressive Strength (psi) | 221 | 184 | | 80 | 101 | 38 | 76 | 70 | 86 | — | 1039 |
| Hydraulic Conductivity (cm/sec) | $4.1 \times 10^{-7}$ | $1 \times 10^{-8}$ | | — | $8.1 \times 10^{-6}$ | — | $9.1 \times 10^{-6}$ | — | $6.4 \times 10^{-6}$ | — | $2.3 \times 10^{-8}$ |

The testing was conducted on 100% Class F CCR material and results demonstrated increased compressive strength and reduction in hydraulic conductivity prior to 28 days of curing. The results indicate that application of ISS techniques on CCR can be successful in increasing compressive strength to strengthen the embankment sidewalls to reduce geotechnical instability and reduction of hydraulic conductivity to create a low permeability barrier or liner.

Example 4

Applications of ISS for Structural Enhancement

ISS techniques and cementitious grouts have previously been designed and utilized to improve structural stability of earthen formations and for structural shoring for excavation and other construction practices. ISS techniques have been successfully integrated as a construction material for overcoming civil/geotechnical engineering challenges in redevelopment and construction, some examples include:

Structural Applications for Reinforcement and Slope Stability: Examples include use of high strength cementitious grout mix designs and strategic sequencing of ISS installation to prevent settlement or structural instability of nearby structures and provide long term stability for existing structures following construction.

Geotechnical Applications for Ground Improvement: Examples include engineered uses of excess ISS material for construction of embankments and future building foundations.

Shoring Applications for Excavation: An example includes the use of completed conventional ISS columns for structural shoring during demolition and removal of historic concrete foundations and structures during decommissioning of former utility structures and utilities. Another example is the use of completed ISS columns as shoring for installation of a box culvert structure in an area of high permeability granular soil and shallow groundwater; the completed ISS columns acted as a barrier wall to prevent groundwater infiltration and as structural shoring.

Example 5

Cost Evaluation

Studies were conducted to compare the costs and feasibility of the disclosed in situ waste remediation methods and systems to excavation and off-site disposal. In designing and conducting the study some common assumptions were made for an accurate comparison. For example, the impoundment volume was assumed to be approximately 1.3 million cubic yards (40 acres or waste material with an average depth or thickness of 20 feet). The excavation assumptions included: excavation volume of 1.3 million cubic yards; excavated ash to be disposed within 50 miles of the impoundment; one cubic yard of ash weighs 2,700 lbs; excavation would require dewatering and water treatment; impoundment would be backfilled and vegetated. In situ waste remediation method and systems assumptions included: ISS volume of 366,000 cubic yards including a 5 foot thick discrete bottom liner and 10 foot wide fully penetrating perimeter walls to 25 feet below grade.

The analysis also assumed that dewatered impoundment water would be used in ISS batch plant, and that the impoundment would be capped with geo-textile and soil cover. Costs were evaluated and analyzed based on recent experience and discussions with contractors (Table 2).

TABLE 2

| Item | Estimated Quantity | Units | Excavation and Off-Site Disposal | | In situ Closure (ISS) | |
|---|---|---|---|---|---|---|
| | | | Unit Price $ | Amount $ | Unit Price $ | Amount $ |
| General Conditions | | | | | | |
| Mobilization & Temporary Facilities Setup | 1 | Lump Sum | $700,000 | $700,000 | $700,000 | $700,000 |
| Site Preparation | 1 | Lump Sum | $1,500,000 | $1,500,000 | $1,500,000 | $1,500,000 |

TABLE 2-continued

| Item | Estimated Quantity | Units | Excavation and Off-Site Disposal | | In situ Closure (ISS) | |
|---|---|---|---|---|---|---|
| | | | Unit Price $ | Amount $ | Unit Price $ | Amount $ |
| Clearing, Grubbing and Erosion Controls Installation Maintenance & Monitoring | 1 | Lump Sum | $300,000 | $300,000 | $300,000 | $300,000 |
| Demobilization & Record Documents | 1 | Lump Sum | $250,000 | $250,000 | $250,000 | $250,000 |
| Excavation & Backfill | | | | | | |
| Excavate Ash, Dewater, and Load | 1,290,667 | Cubic Yards | $20 | $25,813,340 | $— | $— |
| Transport and Dispose of Ash | 1,742,400 | Tons | $60 | $104,544,027 | $— | $— |
| Backfill with Off-site fill | 645,334 | Cubic Yards | $25 | $16,133,338 | $— | $— |
| In-Situ Solidification | | | | | | |
| Mobilize ISS Treatment Equipment and Materials | 1 | Lump Sum | $— | $— | $500,000 | $500,000 |
| In situ Solidification/Stabilization (ISS) | 366,000 | Cubic Yards | $— | $— | $80 | $29,280,000 |
| ISS Swell Management (15%) | 54,900 | Cubic Yards | $— | $— | $4 | $197,640 |
| Geotextile Cap | 40 | Acres | $— | $— | $50,000 | $2,000,000 |
| Dewatering - Excavation | | | | | | |
| Frac Tank Mobilization, Setup and Demobilization | 8 | Each | $3,000 | $24,000 | $— | $— |
| Site Water Management | 104 | Week | $25,000 | $2,600,000 | $— | $— |
| Dewatering - ISS | | | | | | |
| Frac Tank Mobilization, Setup and Demobilization | 4 | Each | $— | $— | $3,000 | $12,000 |
| Site Water Management | 52 | Week | $— | $— | $5,000 | $260,000 |
| Site Restoration | | | | | | |
| Topsoil | 32,267 | Cubic Yard | $— | $— | $26 | $838,942 |
| Seed and Mulch | 40 | Acres | $2,000 | $80,000 | $2,000 | $80,000 |
| TOTAL | | | | $151,945,000 | | $35,919,000 |

The results of the analysis concluded that the volume of waste material to be addressed could be reduced by over 70% by using the disclosed in situ waste remediation methods and systems. Particularly, approximately 1.3 million cubic yards would have to be handled in an excavation and off-site disposal plan. Conversely, only 366,000 cubic yards would be addressed in the in situ waste remediation methods and systems approach as disclosed herein.

The total estimated cost for excavation and off-site disposal was approximately $152 million at approximately $118/cubic yard of waste material. In contrast, the total estimated cost for in situ waste remediation based on the disclosed methods, was approximately $36 million at approximately $28/cubic yard of waste material. Thus, the in situ waste remediation methods and systems approach was estimated to cost less than 25% of the total cost for excavation and off-site disposal.

Example 6

Sustainability Evaluation

Studies were conducted to compare the sustainability of the disclosed in situ waste remediation methods and systems to excavation and off-site disposal. The United States Environmental Protection Agency's Methodology for Understanding and Reducing a Project's Environmental Footprint (EPA 542-R-12-002) was used in the evaluation. The evaluation estimated the project's environmental footprint by considering the following input metrics:

1. materials and waste; inventory of quantities;
2. water, inventory of use;
3. energy, input equipment specifications;
4. air, input equipment specifications;
5. ecology.

A comparison of the environmental footprint was completed for the disclosed in situ waste remediation methods and systems versus an excavation and off-site disposal approach. The results of the analysis are presented in Table 3.

TABLE 3

| Core Element | | Metric | Unit of Measure | Footprint Excavation and Offsite Disposal Total | In situ Closure Total | Total |
|---|---|---|---|---|---|---|
| Materials & Waste | M&W-1 | Refined materials used on-site | Tons | 1,097,071 | 51,468 | (1,045,603) |
| | M&W-2 | % of refined materials from recycled or waste material | % | 0% | 75% | 75% |
| | M&W-3 | Unrefined materials used on-site | Tons | — | — | — |
| | M&W-4 | % of unrefined materials from recycled or waste material | % | — | — | — |
| | M&W-5 | On-site hazardous waste disposed of off-site | Tons | — | — | — |
| | M&W-6 | On-site non-hazardous waste disposed of off-site | Tons | 1,742,400 | 0 | (1,742,400) |
| | M&W-7 | % of total potential waste recycled or reused | % | — | — | — |
| Water | | On-site public water use (by source) | MG | — | — | — |
| Energy | E-1 | Total energy used | MMBtu | 609,209 | 147,543 | (461,666) |
| | E-2 | Total energy voluntarily derived from renewable resources | | | | |
| | E-2A | Biodiesel use and onsite generation or use | MMBtu | 9,804 | 0 | (9,804) |
| | E-2B | Voluntary purchase of renewable electricity | MWh | — | — | — |
| | E-2C | Voluntary purchase of RECs | MWh | — | — | — |
| Air | A-1 | On-site NOx, SOx, and PM emissions | Pounds | 127,945 | 38,192 | (89,753) |
| | A-2 | On-site HAP emissions | Pounds | 9 | 1 | (8) |
| | A-3 | Total NOx, SOx, and PM emissions | Pounds | 1,481,328 | 166,328 | (1,315,000) |
| | A-4 | Total HAP emissions | Pounds | 2,656 | 1,542 | (1,114) |
| | A-5 | Total greenhouse gas emissions | Tons CO2e | 46,207 | 21,439 | (24,768) |
| Land & Ecosystems | | | Qualitative Description | | | |

The above metrics are consistent with Methodology for Understanding and Reducing a Project's Environmental Footprint (EPA 542-R-12-002), February 2012
"MMBtu" = millions of Btus
"MG" = millions of gallons
"CO2e" = carbon dioxide equivalents of global warming potential
"MWh" = megawatt hours (i.e.,, thousands of kilowatt-hours or millions of Watt-hours)
"Tons" = short tons (2,000 pounds)

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for hydraulically isolating waste material from ground water, comprising:
constructing a low permeability hydraulic barrier of a desired thickness between the waste material and the ground water at a predetermined discrete depth, comprising:
vertically penetrating the waste material from an upper surface to a desired depth, wherein the desired depth comprises an area selected to construct the hydraulic barrier which isolates the waste material from the ground water; and
applying a cementitious grout only at the desired depth, wherein the cementitious grout mixes in situ with the waste material or an in place soil material underlying the waste material only at the desired depth,
whereby the low permeability hydraulic barrier is formed between the waste material and the ground water utilizing the waste material or the in place soil material.

2. The method of claim 1, wherein penetrating the waste material to the desired depth comprises vertically advancing a large diameter auger from an upper surface through the waste material to the desired depth prior to applying the cementitious grout.

3. The method of claim 1, wherein the cementitious grout comprises hydraulic cements and admixtures designed to mix with the in place soil materials or waste material to reduce hydraulic conductivity and increase the unconfined strength of a resulting mixture, wherein the low permeability hydraulic barrier is formed in situ while leaving the soil material or waste material in place.

4. The method of claim 1, wherein the low permeability hydraulic barrier has a permeability with a range of $1 \times 10^{-5}$ cm/sec to $1 \times 10^{-10}$ cm/sec, and wherein an unconfined compressive strength achieves a range of strengths designed to meet project requirements ranging as low as about 10 psi to greater than about several thousand psi.

5. The method of claim 1, wherein vertically penetrating the waste material to the desired depth and applying the cementitious grout at the desired depth is repeated a plurality of times in an overlapping pattern from an upper surface of the waste material so that a continuous low permeability hydraulic barrier is formed between the waste material and the ground water utilizing in place soil material or waste material.

6. A method for in situ waste impoundment remediation, comprising:
providing a waste impoundment with waste material therein, the waste impoundment comprising a perimeter and a bottom, the waste material contained within the waste impoundment having an upper surface;
constructing a discrete horizontal liner of a desired thickness in situ at the bottom of the waste impoundment, comprising:
vertically advancing continuously overlapping large diameter augers from the upper surface of the waste material to a desired depth; and
injecting a cementitious grout only at the desired depth, whereby the cementitious grout mixes with the waste material or soil material underlying the waste material only at the desired depth and solidifies to form a discrete horizontal liner of a desired thickness at the bottom of the waste impoundment while leaving the soil material or waste material in place; and
constructing a low permeability vertical containment wall at the perimeter of the impoundment.

7. The method of claim 6, further comprising constructing a cover over the waste material in the impoundment, whereby the upper surface of the waste material is fully encapsulated in the waste impoundment by the horizontal liner, vertical containment wall, and the cover.

8. The method of claim 7, wherein the horizontal liner, the vertical containment wall, and the cover together form a low permeability hydraulic barrier between the waste material and ground water utilizing the in place soil material or waste material.

9. The method of claim 6, wherein the low permeability hydraulic barrier has a permeability with a range of $1\times10^{-5}$ cm/sec to $1\times10^{-10}$ cm/sec, and wherein an unconfined compressive strength achieves a range of strengths designed to meet project requirements ranging as low as about 10 psi to greater than about several thousand psi.

10. The method of claim 6, further comprising preparing a site for in situ remediation, comprising assessment of an impoundment construction, ground water assessment, geotechnical analysis, determination of cementitious grout materials, dewatering of the waste impoundment, and grading of the upper surface of the waste material.

11. The method of claim 6, wherein the continuously overlapping large diameter augers are vertically advanced a plurality of times through the waste material to the bottom of the waste impoundment or underlying soil material so that a continuous low permeability hydraulic barrier is formed.

12. The method of claim 6, wherein the cementitious grout comprises water and cementitious grout materials.

13. The method of claim 12, wherein the cementitious grout materials comprise soil material or waste material specific cementitious grout materials.

14. The method of claim 6, wherein constructing the vertical containment wall at the perimeter of the waste impoundment further comprises forming in situ solidified columns through soil material or waste material within the perimeter of the impoundment, further comprising adjoining the horizontal liner at the bottom of the impoundment with the vertical containment wall.

15. The method of claim 6, wherein constructing the vertical containment wall at the perimeter of the impoundment enhances geotechnical stability by increasing embankment strength, reducing saturated conditions and increasing the overall factor of safety for slope failure.

16. The method of claim 6, wherein the horizontal liner can be contoured to facilitate ground water or leachate monitoring and collection.

17. A system for hydraulically isolating waste material from ground water, comprising:
  a low permeability hydraulic barrier of a desired thickness between the waste material and the ground water utilizing in place soil material or waste material;
  a penetrating machine for vertically penetrating the waste material to a desired depth, wherein the desired depth comprises an area selected to construct the low permeability hydraulic barrier which isolates the waste material from the ground water; and
  an application machine for applying a cementitious grout only at the desired depth so that the cementitious grout mixes in situ with the waste material or soil material only at the desired depth underlying the waste material, whereby a low permeability hydraulic barrier of a desired thickness is formed in situ between the waste material and the ground water while leaving the soil material or waste material in place.

18. The system of claim 17, wherein the low permeability hydraulic barrier comprises a low permeability discrete horizontal liner and vertical containment wall created utilizing in place soil material or waste material.

* * * * *